United States Patent [19]
Pittman

[11] Patent Number: 4,797,103
[45] Date of Patent: Jan. 10, 1989

[54] LEARNING BOARD

[76] Inventor: Susan Pittman, Rte. 2 Box 353-AA, Lowell, Ark. 72745

[21] Appl. No.: 123,728

[22] Filed: Nov. 23, 1987

[51] Int. Cl.⁴ ............................................. G09B 19/00
[52] U.S. Cl. .................................................... 434/211
[58] Field of Search ............... 434/188, 191, 200, 207, 434/211, 210, 189

[56] References Cited

U.S. PATENT DOCUMENTS

| | | | |
|---|---|---|---|
| 1,656,030 | 1/1928 | Waring | 434/207 |
| 2,430,362 | 3/1969 | Jacobson | 434/200 |
| 3,191,318 | 6/1965 | Hoffmann | 434/211 |
| 4,006,541 | 2/1977 | Miller | 434/172 X |
| 4,188,734 | 2/1980 | Rich | 434/172 X |
| 4,204,343 | 5/1980 | Brooks | 434/172 |
| 4,221,061 | 9/1980 | Settle | 434/172 |
| 4,306,868 | 12/1981 | Hankins | 434/159 X |
| 4,424,039 | 1/1984 | Washburn | 434/191 X |
| 4,515,566 | 5/1985 | Sprague | 434/172 |

Primary Examiner—William H. Grieb
Attorney, Agent, or Firm—Leon Gilden

[57] ABSTRACT

An educational device is set forth in application for the training and education of young children or of mentally deficient individuals. A background board has positioned thereon a plurality of removable pegs. A matrix of pegs is utilized in the body of the board for the orientation of pre-selected geometrical shapes of varying colors. A plurality of pegs is positioned in overlying relationship to the matrix for indication of a pre-selected number of the varying geometrical configurations. Spinners may be utilized in the random selection of a geometrical configuration to be utilized and a second spinner to be implemented for the random selection of a coloration of the geometrical shape. Accordingly, association of colors and geometrical configurations is available for educational purposes as set forth above.

7 Claims, 3 Drawing Sheets

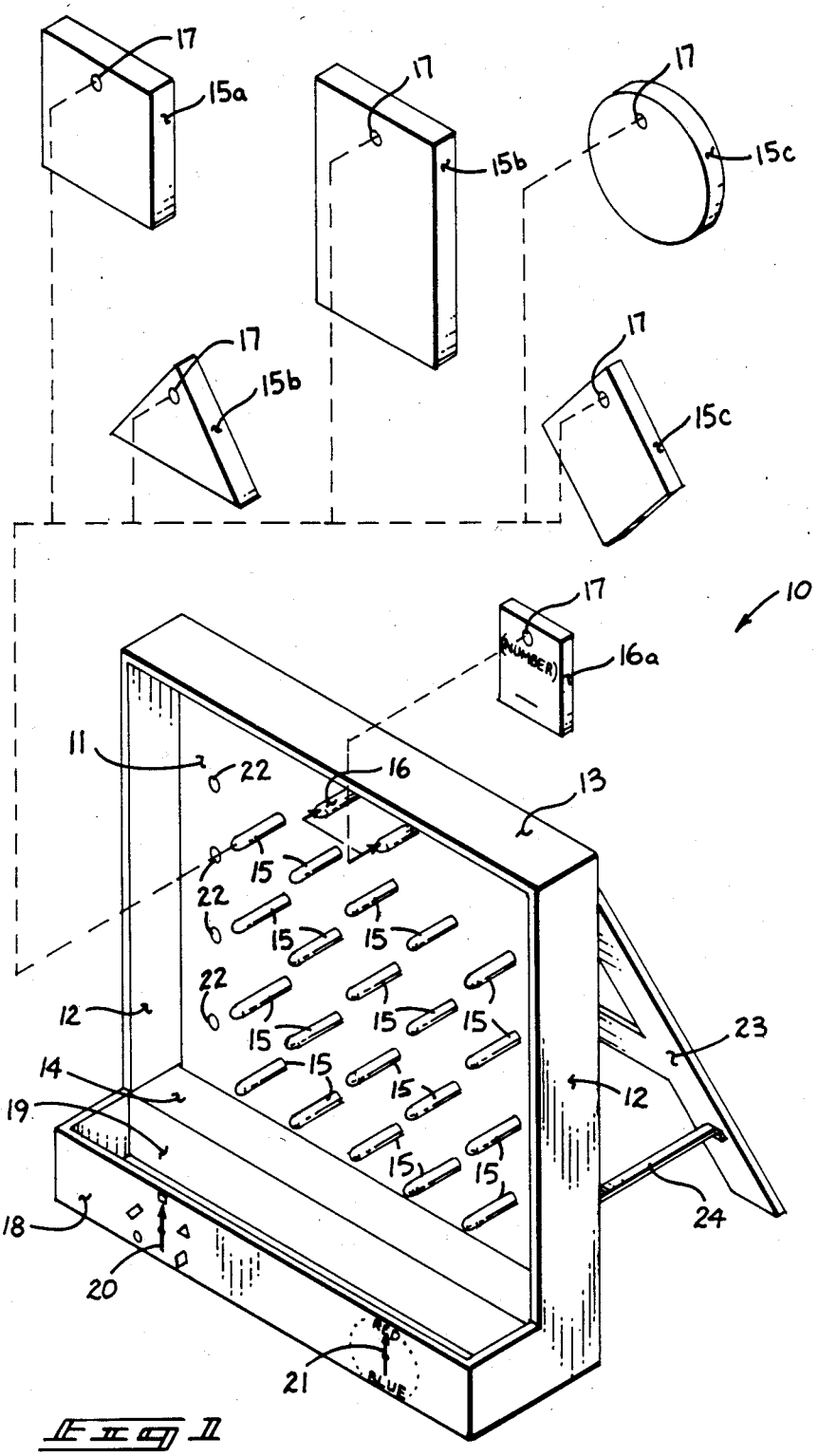

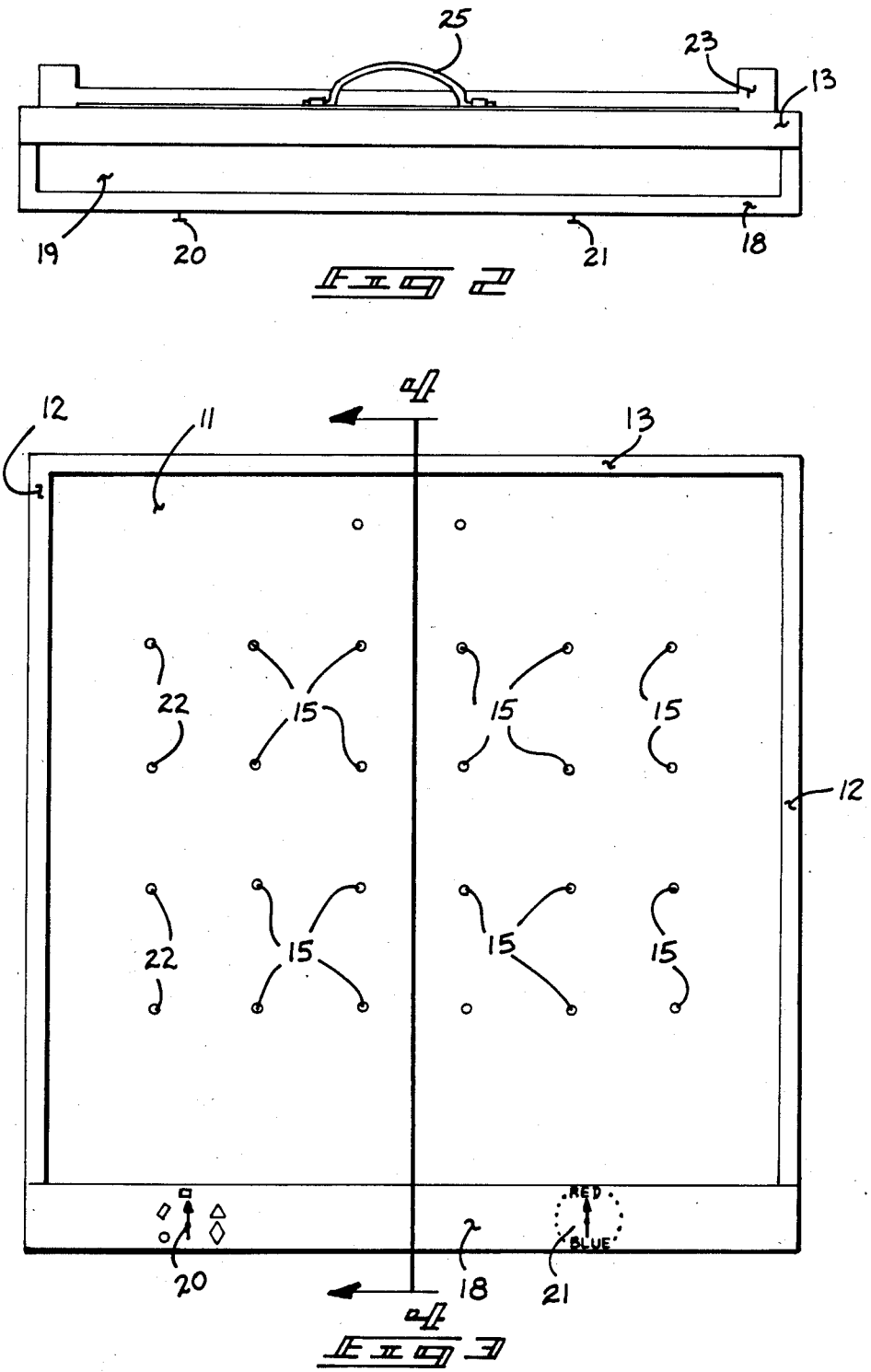

LEARNING BOARD

BACKGROUND OF THE INVENTION

1. Field of the Invention

The present invention relates to educational devices, and more particularly pertains to a new and improved learning board which enables the enhanced understanding of geometrical configuration and coloration association.

2. Description of the Prior Art

The use of educational devices is well known in the prior art. As may be appreciated, these devices are generally directed at particular age or mental aptitude groups. It is desirable in the implementation of such games that a ready grasping of the purpose of such a tool be understood both by the instructor and by the individuals receiving the instruction. For example, U.S. Pat. No. 4,006,541 to Miller includes a training device wherein a portable storage container includes a plurality of cards positionable exteriorly of said storage container on pegs for the education and communication of the information positioned on said cards. The Miller device is of a more cumbersome and limited nature in the teaching of visual and spatial relationships of varying configurations and colorations.

U.S. Pat. No. 4,188,734 to Rich sets forth a board including a plurality of openings positioned therein for the orientation of pre-selected pegs therein wherein series of openings and associated pegs are of comparable colorations for educational purposes. Application for Braille indicia are also set forth. The present invention diverges from the Rich teaching in that there is a three part association of geometrical shapes, varying colorations of said shapes, and a pre-selected number of said shapes to be arranged on the pegs of the board of the instant invention. Furthermore the random selection of the aforenoted shapes and colorations tends to enhance the interest of the intended trainees utilizing the instant invention.

U.S. Pat. No. 4,204,343 to Brooks sets forth a spelling aid for the education of individuals wherein various cards are associated with various pockets on a board for the spelling of intended words.

U.S. Pat. No. 4,221,061 to Settle utilizes an alphabetical teaching game for the composing of words including structural deviations among the various portions of the alphabet for instruction to the trainees of such devices. The scope and object of the instant invention are clearly at a variance with this device.

U.S. Pat. No. 4,515,566 to Sprague uses a flip-card apparatus which may include Braille symbols for the teaching of spelling and the like.

As such, it may be appreciated that there is a continuing need for a new improved educational device which addresses both the problems of geometrical association, color association, and understanding of the counting system as it relates to the association of such shapes and colorations and in this respect, the present invention substantially fulfills this need.

SUMMARY OF THE INVENTION

In view of the foregoing disadvantages inherent in the known types of learning devices now present in the prior art, the present invention provides a learning device wherein the same may be oriented and positioned in an upright position as desired for the training of individuals of impaired abilities or of young age to associate various geometrical shapes, colorations, and relate those to the counting system. As such, the general purpose of the present invention, which will be described subsequently in greater detail, is to provide a new and improved learning device which has all the advantages of the prior art learning devices and none of the disadvantages.

To attain this, the present invention comprises a portably totable board including a pivotal brace for the upright positioning of said board to enable visual access to said board. A plurality of uppermost mounted pegs are positioned for acceptance of a digital card or cards to present a particular number to be understood and ascertained by the trainees of this device as the number goal to be attained. A matrix of pegs are positioned underlying the plural pegs whereupon a spinner mounted on a storage portion of the board may be utilized for the selection of particular geometrical shape and a second spinner utilized in like manner for selection of a coloration. A vast number of permutations of combinations of coloration and geometrical shape may therefore be selected for educational purposes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved learning device which has all the advantages of the prior art learning devices and none of the disadvantages.

It is another object of the present invention to provide a new and improved learning device which may be easily and efficiently manufactured and marketed.

It is a further object of the present invention to provide a new and improved learning device which is of a durable and reliable construction.

An even further object of the present invention is to provide a new and improved learning device which is susceptible of a low cost of manufacture with regard to both materials and labor, and which accordingly is then susceptible of low prices of sale to the consuming public, thereby making such learning devices economically available to the buying public.

Still yet another object of the present invention is to provide a new and improved learning device which provides in the apparatuses and methods of the prior art some of the advantages thereof, while simultaneously overcoming some of the disadvantages normally associated therewith.

Still another object of the present invention is to provide a new and improved learning device wherein a matrix of pegs is presented for the acceptance of various geometrical shapes and colorations of said shapes.

Yet another object of the present invention is to provide a new and improved learning device wherein a plurality of pegs are positioned for the support of a digit selection to associate the geometrical shapes and their colorations with the pre-selected digit to thereby utilize a like number of shapes to said digit selection.

Even still another object of the present invention is to provide a new and improved learning device wherein random selection means are utilized for the selection of the various geometric shapes and colorations to be utilized by the instant invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the present invention illustrating the structure and the positioning of the number tags and geometrical configurations in a somewhat exaggerated view.

FIG. 2 is a top orthographic view of the instant invention.

FIG. 3 is an orthographic view of the instant invention taken in elevation.

DESCRIPTION OF THE PREFERRED EMBODIMENT

Figure 4:
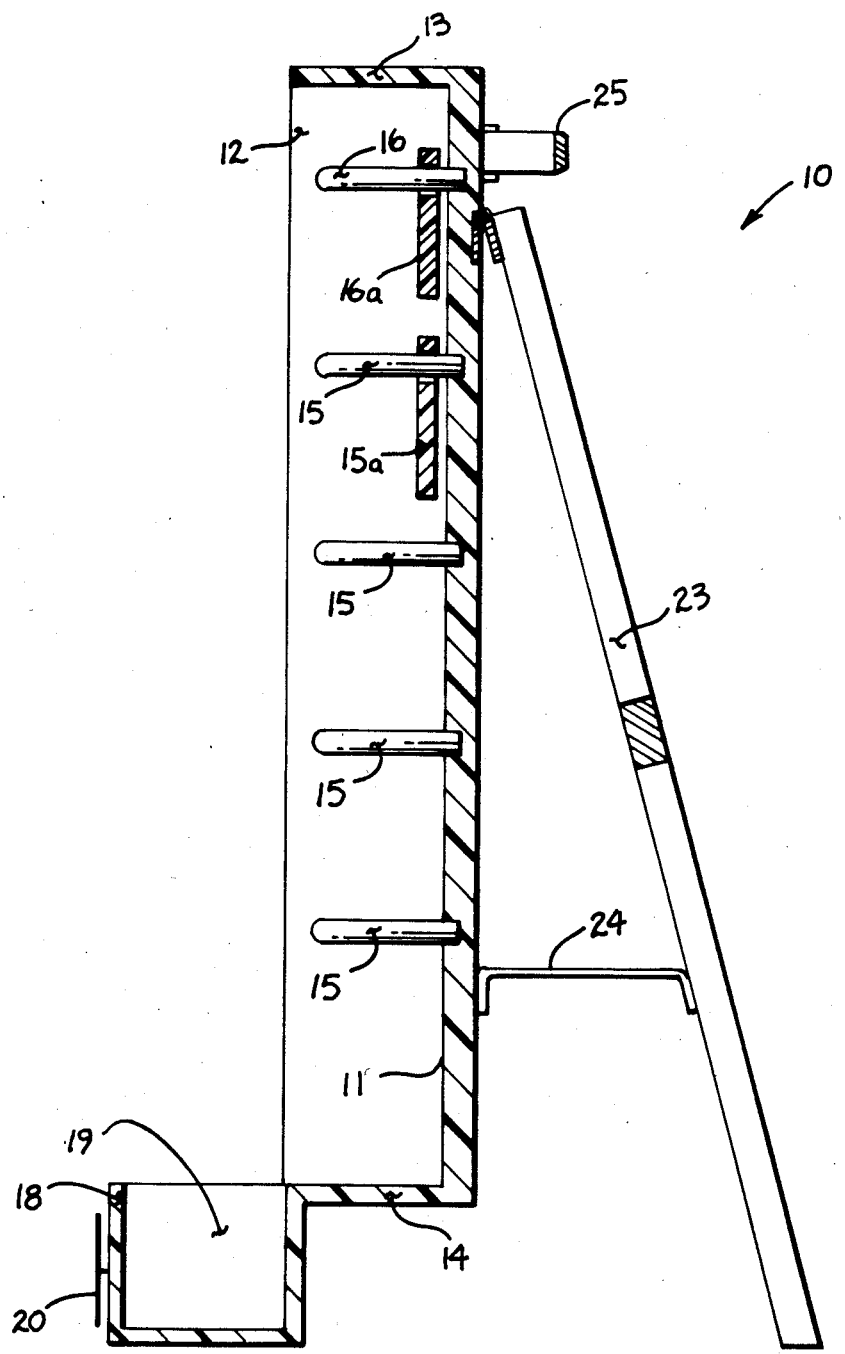
FIG. 4 is a side orthographic view of the instant invention taken along the lines 4—4 of FIG. 3 in the direction indicated by the arrows.

With reference now to the drawings, and in particular to FIG. 1 thereof, a new and improved learning board embodying the principles and concepts of the present invention and generally designated by the reference numeral 10 will be described.

More specifically, it will be noted that the learning board device 10 essentially comprises a board surface 11 framed by a pair of side frame members 12 at either lateral extremity thereof with a top frame member 13 and a bottom frame member 14 to surroundingly frame and provide a measure of protection to the board surface 11 as well as tending to direct or focus attention thereon. A matrix of support pegs 15 are secured within blind bores 22 of surface 11. The pegs 15 are selectively positionable within bores 22 to provide a pre-determined array dependent on the number of associated geometrical configurations to be selected.

Geometrical configurations are selected from the group illustrated including a square 15a, rectangle 15b, circle 15c, triangle 15d, and diamond 15e. The aforenoted configurational shapes are positionable on support pegs 15 by means of openings 17 formed in each shape to be selected. The particular material from which the shapes 15a through 15e are formed is not limiting except for the need for durability such as in the use of wood or relatively stiff pasteboard in construction. A plurality of number cards 16a are registerable with number pegs 16 by means of openings 17 formed therein, as illustrated. The number cards 16a may be used singly or in pairs in association with the pair of pegs 16 dependent on whether a single or plural digit number is utilized in the learning procedure.

It is contemplated that the various geometric configurational shapes 15a through 15e each be of at least a plurality of colorations such to be selected from the group of black, white, green, yellow, red, blue, orange, brown, gray, and purple. These colorations are selected for their visual impact and clearly further hues may be selected as desirable. Integrally secured to the learning board 10 is a storage compartment 18 formed with a chamber 19 for storage of the various configurational shapes. Positioned on a forward face of said storage compartment 18 are a plurality of spinners. Geometric spinner 20 is utilized in random selection of a particular shape to be selected whereas color spinner 21 is to select from a plurality of colors for use by the students and instructors utilizing the learning board 10. A pivot support 23 is rearwardly positioned on learning board 10 for support thereof and is secured to the learning board 10 by a plurality of flexible connectors 24. A handle 25 positioned above said pivot support 23 enables more ready transport of the instant invention.

As to the manner of usage and operation of the present invention a brief description is illustrative. An instructor may select a desired number dependent on the progress or aptitude of the student or trainee involved. Accordingly, a number card 16a is positioned on a peg 16 or alternatively if a double digit number is selected, a plurality of such cards will be utilized and positioned. The geometric spinner may then be spun to randomly select a geometric shape and accordingly the color spinner may also so be utilized. Additionally, it is frequently desirable to select not only a single shape and color and therefore the procedure is repeated until all of the pegs and associated colors are so chosen and positioned. Various of the matrix support pegs 15 may be removed as indicated by the non-utilized blind bores 22, as illustrated in FIG. 1 for example, to limit or arrange a particular desired configuration of pegs, such as a diamond shape arrangement to accommodate diamond shaped members 15e. It is also desirable at times to limit certain portions of board 11 to certain colorations whereby, for example, should red be selected as indicated the top row of support pegs 15 will be limited to red squares as the selection illustrated in FIG. 1 and then accordingly, the remaining pegs may also then be divided for certain colorations or configurations depending on the progress of the student or trainee. It may therefore be appreciated that the spatial and color coordination availed by use of this device is enhanced. Furthermore, the grasping of colors and geometric configurations is improved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A learning board for learning concepts of color, geometric configuration, and counting comprising,
    a board means formed with a matrix of blind bores for the selective positioning of a pre-determined matrix of support pegs within said bores,
    plural sets of geometric configurations wherein each set includes a plurality of similar geometrically shaped elements, each set comprising a geometric shape of elements, each of said elements in said set formed of a unitary color and each set including a plurality of colors, and
    peg means in overlying relationship to said matrix for the acceptance of pre-selected number cards, each of said number cards including a number thereon for determining the number of geometrical elements to be selected, and
    random selector means for the selection of a particular geometric shape from among said sets of geometric shapes and for the random selection of a color within the geometric set selected.

2. A learning board as set forth in claim 1 wherein said learning board is formed with a storage compartment wherein said storage compartment includes a chamber for the storage of said geometric sets.

3. A learning board as set forth in claim 2 wherein said storage compartment is integrally secured to said learning board forwardly thereof and in underlying relationship to said matrix.

4. A learning board as set forth in claim 3 wherein a pivotal support is pivotally secured rearwardly of said board means for enhancing stability of said board means and enabling vertical positioning of said board means relative to a support surface.

5. A learning board as set forth in claim 4 wherein said random selector means includes a plurality of spinners with a first spinner for the random selection of a geometric shape and a second spinner for the selection of a random color from a group of colors.

6. A learning board as set forth in claim 5 wherein said spinners are rotatably mounted on a forward face of said storage compartment.

7. A learning board as set forth in claim 6 wherein a handle is secured rearwardly of said board means in an overlying position to said pivotal support.

* * * * *